(12) United States Patent
Harada (10) Patent No.: US 8,010,271 B2
(45) Date of Patent: Aug. 30, 2011

(54) BRAKE CONTROL DEVICE FOR ELECTRIC VEHICLE

(75) Inventor: Ryotaro Harada, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 672 days.

(21) Appl. No.: 12/159,478

(22) PCT Filed: May 30, 2007

(86) PCT No.: PCT/JP2007/060977
§ 371 (c)(1),
(2), (4) Date: Jun. 27, 2008

(87) PCT Pub. No.: WO2008/146369
PCT Pub. Date: Dec. 4, 2008

(65) Prior Publication Data
US 2010/0049416 A1   Feb. 25, 2010

(51) Int. Cl.
*G05D 1/12* (2006.01)
(52) U.S. Cl. ............... 701/81; 701/83; 701/78; 701/71; 477/182; 180/65.1; 180/65.265; 180/65.285; 180/65.31; 903/947; 903/930
(58) Field of Classification Search ............ 701/81, 701/83, 78, 71; 477/182; 180/65.1, 65.265, 180/65.285, 65.31; 903/947, 930
See application file for complete search history.

(56) References Cited

U.S. PATENT DOCUMENTS

| | | | |
|---|---|---|---|
| 5,471,387 A | 11/1995 | Wood et al. | |
| 6,496,768 B2 * | 12/2002 | Yamamoto | 701/70 |
| 6,510,466 B1 | 1/2003 | Cox et al. | |
| 7,346,443 B2 * | 3/2008 | Thibault | 701/70 |
| 7,845,737 B2 * | 12/2010 | Negoro | 303/20 |
| 2002/0032763 A1 | 3/2002 | Cox et al. | |
| 2004/0095382 A1 | 5/2004 | Fisher et al. | |
| 2004/0144838 A1 | 7/2004 | Lagosanto et al. | |
| 2005/0021600 A1 | 1/2005 | Lagosanto et al. | |
| 2005/0050159 A1 | 3/2005 | Suraski | |
| 2005/0080882 A1 | 4/2005 | Philyaw et al. | |

(Continued)

FOREIGN PATENT DOCUMENTS

JP    63-9477 Y2    3/1988

(Continued)

OTHER PUBLICATIONS

Form PCT/ISA/210 (International Search Report) dated Feb. 15, 2007.

(Continued)

*Primary Examiner* — Anne Marie M Boehler
*Assistant Examiner* — Marlon A Arce
(74) *Attorney, Agent, or Firm* — Buchanan Ingersoll & Rooney PC (57) ABSTRACT

A brake control device for an electric vehicle includes an instruction controller, a pattern generator, and comparators. The instruction controller generates an instruction signal for instructing a motor about electric brake force. The pattern generator generates a first pattern signal for changing over electric brake force to machine brake force and a second pattern signal obtained by shifting the first pattern signal by a predetermined frequency. One of the comparators outputs, as an electric-brake force pattern, smaller one of the instruction signal and the first pattern signal. The other of the comparators outputs, as a notification signal, a signal output when the second pattern signal becomes equal to or smaller than the instruction signal.

3 Claims, 6 Drawing Sheets

U.S. PATENT DOCUMENTS

| | | | |
|---|---|---|---|
| 2007/0106446 A1* | 5/2007 | Phillips et al. | 701/71 |
| 2008/0036294 A1* | 2/2008 | Yamamoto et al. | 303/116.1 |
| 2008/0097675 A1* | 4/2008 | Konishi et al. | 701/75 |
| 2008/0265662 A1* | 10/2008 | Karnjate et al. | 303/3 |
| 2009/0096279 A1* | 4/2009 | Hosaka et al. | 303/11 |
| 2011/0022276 A1* | 1/2011 | Thaduvayi et al. | 701/48 |

FOREIGN PATENT DOCUMENTS

| | | |
|---|---|---|
| JP | 1-233152 A | 9/1989 |
| JP | 3-14760 A | 1/1991 |
| JP | 06-090503 | 3/1994 |
| JP | 8-164857 A | 6/1996 |
| JP | 08-205317 | 8/1996 |
| JP | 10-262302 | 9/1998 |
| JP | 11-59400 A | 3/1999 |
| JP | 2007-060867 | 3/2007 |
| TW | 277549 | 4/2007 |
| WO | WO 03/013100 A3 | 2/2003 |

OTHER PUBLICATIONS

PCT/ISA/210 and PCT/ISA/237 for PCT/JP2007/060977.

Decision of Patent Grant issued in the corresponding Korean Patent Application No. 9-5-2009-051403514 dated Dec. 14, 2009.

* cited by examiner

BRAKE CONTROL DEVICE FOR ELECTRIC VEHICLE

TECHNICAL FIELD

The present invention relates to a brake control device for an electric vehicle, and, more particularly to a technology for blending control between an electric brake and a machine brake including an air brake in an electric vehicle.

BACKGROUND ART

In recent years, in a railroad vehicle using an electric motor as an engine (hereinafter, "electric vehicle"), a brake system often uses an electric brake as a braking unit that decreases the speed of the electric vehicle. When such an electric brake is used in combination with a machine brake, a blending control is necessary that changes over from the electric brake to the machine brake by initiating the application of the machine brake while releasing the electric brake before the electric vehicle is stopped.

In general, a main converter controls the electric brake, while a machine brake controller controls the machine brake. On the other hand, in the case of blending control, the machine brake controller monitors the brake force of the electric brake, and the application of the machine brake is initiated so that the total brake force of the electric brake force and the machine brake force is maintained constant. When the response of the machine brake is slow, the total brake force is not maintained constant due to a delayed initiation of the application of the machine brake force. This makes the deceleration speed unstable, resulting in poor ride comfort.

As one of approaches to solve this problem, there has been proposed a control method of outputting, from the main converter to the machine brake controller, a release notification signal for notifying the release of the electric brake at a slightly higher speed than the releasing speed of the electric brake (for example, see Patent Document 1).

According to the method disclosed in Patent Document 1, the machine brake controller advances the timing to issue an instruction to initiate the application of the machine brake by monitoring the release notification signal, thereby matching the initiation of the application of the machine brake force with the initiation of the release of the electric brake force. That is, according to the conventional method, the release notification signal is output when the speed is slightly higher than the speed for releasing the electric brake (electric-brake releasing speed). Thereafter, when the speed reduces to the electric-brake releasing speed, the release of the electric brake is started.

Patent Document 1: Japanese Patent Application Laid-open No. H8-164857

DISCLOSURE OF INVENTION

Problem to be Solved by the Invention

However, according to the conventional method of outputting the release notification signal, as described above, the release notification signal is output at a point when the speed is slightly higher than the electric-brake releasing speed. Thereafter, when the speed reduces to the electric-brake releasing speed, the release of the electric brake is initiated. Such a method involves the following problems.

First, a difference between the timing of releasing the electric brake and the timing of outputting the release notification signal may be unstable. This causes excessive brake force or shortage of brake force.

Further, when the release startup speed of the electric brake is not set variable, and when the timing of changing over from the electric brake to the air brake is short, the amount of using the electric brake decreases, and the amount of using the machine brake increases. Because the electric brake regenerates electric energy from the motor, increased use of the electric brake saves energy and decreases cost. Decreased use amount of the machine brake decreases abrasion of a brake shoe, and decreases maintenance cost. That is, according to the conventional method, the use of the electric brake decreases, and the use of the machine brake increases, resulting in low energy-saving effect, and high cost.

On the other hand, even when the release startup speed of the electric brake is set variable, when a position of a master controller that determines a deceleration rate of deceleration changes, a difference between the timing of releasing the electric brake and the timing of outputting the release notification signal is unstable. This makes the timing of the application of the air brake advanced or delayed, and thus causes excessive brake force or shortage of brake force. Consequently, unnecessary abrasion of wheels occurs, resulting in poor ride comfort.

The present invention has been achieved to solve the above problems in the conventional technology and it is an object of the present invention to provide a brake control device for an electric vehicle that suppresses a state of excessive brake force or shortage of brake force, thereby increasing the energy-saving effect and suppressing cost increase, by outputting a release notification signal corresponding to a release startup speed of the electric brake.

It is another object of the present invention to provide a brake control device for an electric vehicle that suppresses a state of excessive brake force or shortage of brake force, thereby increasing the energy-saving effect and suppressing cost increase, even when a position of a master controller is changed.

Means for Solving Problem

To solve the problems and achieve the object mentioned above, there is provided a brake control device for an electric vehicle. The brake control device includes a motor controller that outputs a motor control signal for controlling one or a plurality of motors for driving an electric vehicle; an electric brake controller that generates an actual electric-brake-force signal indicating actual electric brake force generated by each motor, and a release notification signal for notifying release of an electric brake in advance by a predetermined amount of time; and a machine brake controller that controls total brake force of electric brake force and machine brake force based on the actual electric-brake-force signal and the release notification signal output from the electric brake controller. The electric brake controller includes an electric-brake-force instruction controller that generates an electric-brake force instruction to each motor; a comparison pattern generator that generates a release electric-brake force comparison pattern as an instruction value pattern for, while reducing electric brake force to zero at a closing speed of the electric brake, changing over electric brake force to machine brake force, and a release-notification-signal electric-brake-force comparison pattern obtained by shifting the release electric-brake force comparison pattern by a predetermined frequency to a side on which motor frequency increases; a first comparator that compares the electric-brake force instruction with the release electric-brake force comparison pattern, and outputs, as an electric-brake force pattern, a smaller signal of the electric-brake force instruction and the release electric-brake force comparison pattern to the motor controller; and a second comparator that compares the electric-brake force instruction with the release-notification-signal electric-brake-force comparison pattern, and outputs, as the release notification signal, a signal output at a timing when the release-notification-signal electric-brake-force comparison pattern becomes equal to or smaller than the electric-brake force instruction to the machine brake controller.

Effect of the Invention

According to the present invention, a brake control device for an electric vehicle includes an electric brake controller. The electric brake controller includes an electric-brake-force instruction controller, a comparison pattern generator, a first comparator, and a second comparator. The electric-brake-force instruction controller generates an electric-brake force instruction to each motor. The comparison pattern generator generates, while reducing the electric brake force to zero at a closing speed of the electric brake, a release electric-brake force comparison pattern for changing over electric brake force to machine brake force, and a release-notification-signal electric-brake-force comparison pattern obtained by shifting the release electric-brake force comparison pattern by a predetermined frequency to a side on which motor frequency increases. The first comparator outputs, as an electric-brake force pattern, a smaller signal selected from the electric-brake force instruction and the release electric-brake force comparison pattern to the motor controller. The second comparator outputs, as the release notification signal, a signal output at a timing when the release-notification-signal electric-brake-force comparison pattern becomes equal to or smaller than the electric-brake force instruction to the machine brake controller. Therefore, a release notification signal corresponding to a release startup speed of the electric brake can be output. Thus, the energy-saving effect can be increased and the cost increase can be suppressed without causing excessive brake force or shortage of brake force.

EXPLANATIONS OF LETTERS OR NUMERALS

1 Main converter
2 Machine brake controller
3 Actual electric-brake-force signal
4 Release notification signal
5 Comparison pattern generator
6 Actual electric-brake-force calculator
7, 8 Comparator
9 Release-electric-brake-force comparison pattern
10 Release-notification-signal electric-brake-force comparison pattern
11 Electric-brake force pattern
12 Electric-brake release table
13 Lead-in table
14 Electric-brake force instruction
15 Electric-brake-force instruction controller
16 Release-speed-variable-type release-notification-signal generator
17 Lead-in electric-brake force
18 Subtractor
31 Motor controller
32 Motor group
33 Machine brake
34 Electric brake controller
S1, S2 Signal line

BEST MODE(S) FOR CARRYING OUT THE INVENTION

Exemplary embodiments of a brake control device for an electric vehicle according to the present invention are explained in detail below with reference to the accompanying drawings. Note that the present invention is not limited to the embodiments.

(Configuration of the Brake Control Device)

Figure 1:
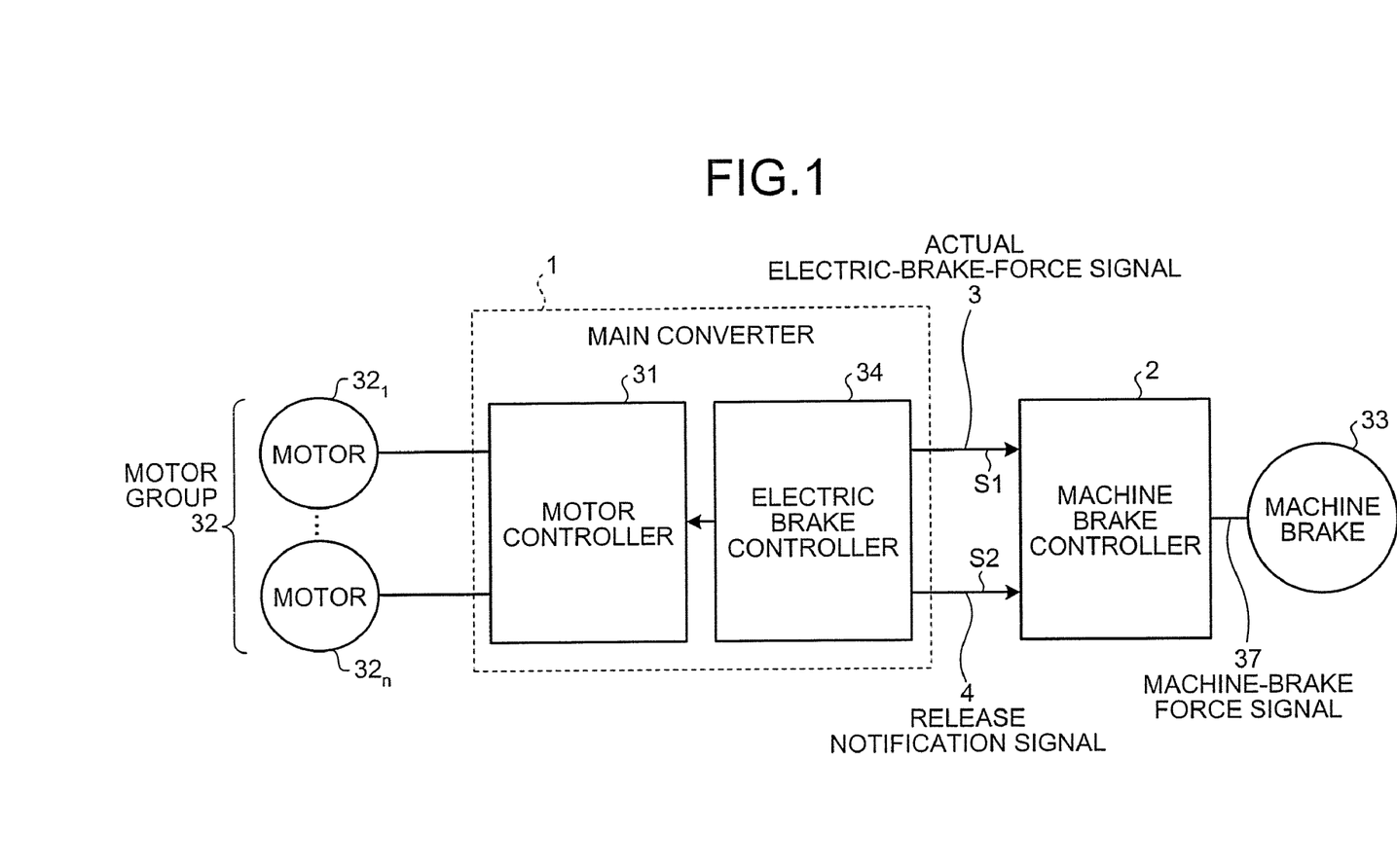
FIG. 1 a schematic diagram of a brake control device for an electric vehicle according to an embodiment of the present invention.

FIG. 1 is a schematic diagram of a brake control device for an electric vehicle according to an embodiment of the present invention. The brake control system shown in FIG. 1 includes a main controller 1 that controls one or more motors ($32_1, \ldots, 32_n$) constituting a motor group 32, and a machine brake controller 2 that controls a machine brake 33 including an air brake and the like. The main converter 1 includes a motor controller 31 that directly controls the motors ($32_1, \ldots, 32_n$), and an electric brake controller 34 that gives a control signal (electric brake signal) to the motors ($32_1, \ldots, 32_n$) through the motor controller 31. The electric brake controller 34 is connected to the machine brake controller 2 via signal lines S1 and S2. The brake control device according to the embodiment includes the motor controller 31, the electric brake controller 34, and the machine brake controller 2.

(Function of the Brake Control Device)

In FIG. 1, the motor controller 31 of the main converter 1 controls the rotation of each of the motors ($32_1, \ldots, 32_n$) constituting the motor group 32 by outputting a predetermined voltage and an AC voltage of a predetermined frequency based on PWM (Pulse Width Modulation) control and the like. The electric brake controller 34 generates an actual electric-brake-force signal 3 indicating the actual electric brake force, and a release notification signal 4 for notifying release of the electric brake at a certain time beforehand, and outputs the generated signals to the machine brake controller 2. The machine brake controller 2 determines machine brake force such as the air brake force based on the actual electric-brake-force signal 3 input through the signal line S1 and the release notification signal 4 input through the signal line S2, and outputs a machine-brake force signal 37.

(Operation of the Brake Control Device)

In FIG. 1, the main converter 1 including the motor controller 31 and the electric brake controller 34 obtains predetermined electric brake force by regenerating each motor to operate the electric brake, and at the same time, returns predetermined electric force to an overhead wire by operating each motor as a power generator, or consumes the electric power using a consuming device (not shown). The main converter 1 also outputs the actual electric-brake-force signal 3 and the release notification signal 4 described above. On the other hand, the machine brake controller 2 controls the total brake force and the machine brake force. In this case, the machine brake controller 2 calculates shortage brake force necessary to hold predetermined total brake force based on the actual electric-brake-force signal 3 output from the electric brake controller 34 of the main converter 1, and at the same time, controls to compensate for the shortage brake force with the machine brake force. The machine brake controller 2 also controls to increase the machine brake force, knowing that the electric brake is released in a predetermined time, based on the release notification signal 4 output from the electric brake controller 34 of the main converter 1. In this case, the machine brake controller 2 controls not to change the deceleration rate, by holding the total brake force of the electric brake force and the machine brake force at a constant level.

(Configuration of the Electric Brake Controller)

Figure 2:
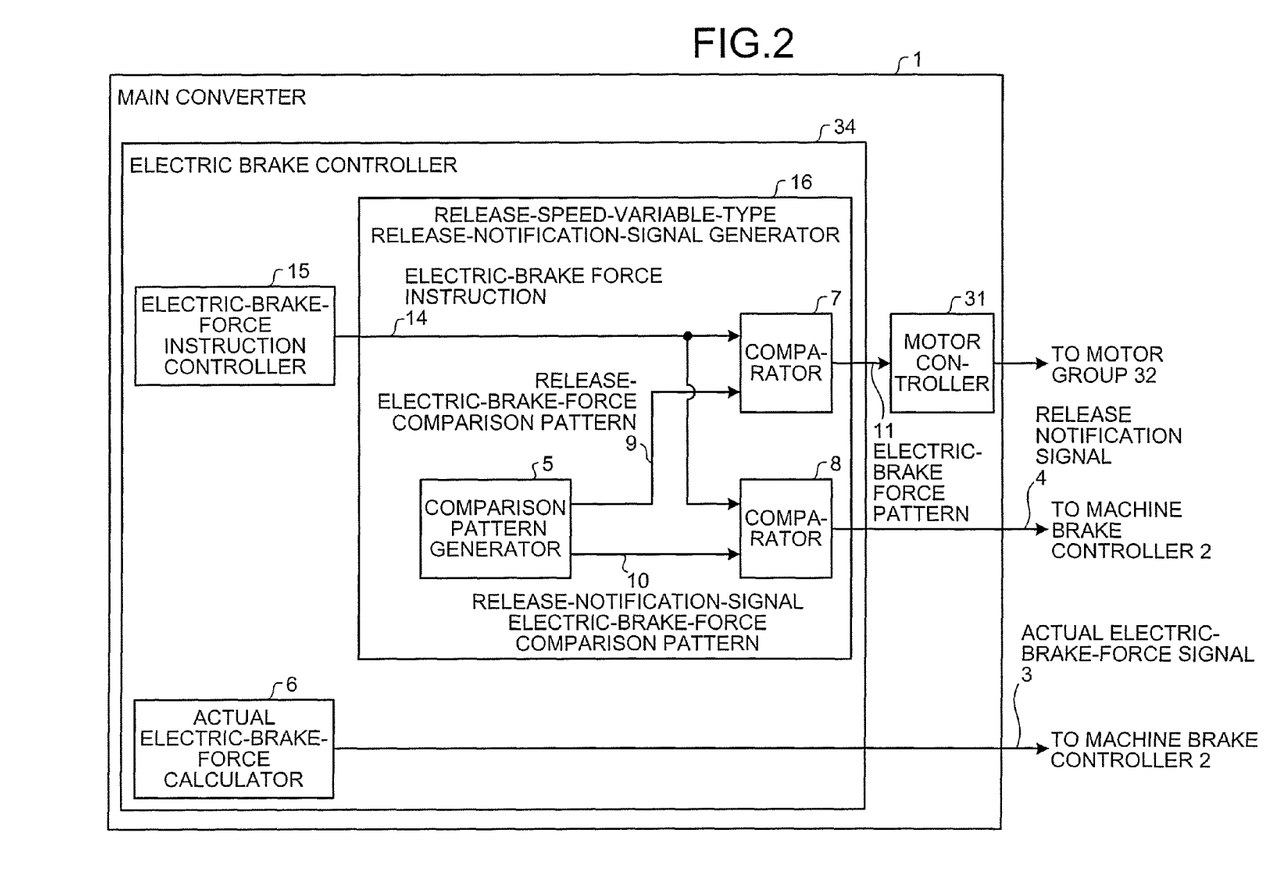
FIG. 2 is a schematic diagram of a control system of an electric brake controller in a main converter.

FIG. 2 is a schematic diagram of the electric brake controller 34 in the main converter 1. As shown in FIG. 2, the electric brake controller 34 in the main converter 1 includes an actual electric-brake-force calculator 6, an electric-brake-force instruction controller 15, and a release-speed-variable-type release-notification-signal generator 16. The electric-brake-force instruction controller 15 includes a comparison pattern generator 5, and comparators 7 and 8.

(Operation of the Electric Brake Controller)

In FIG. 2, the electric-brake-force instruction controller 15 generates an electric-brake force instruction 14, and outputs the electric-brake force instruction 14 to the comparator 7 as a first comparator. The comparison pattern generator 5 generates a release-electric-brake-force comparison pattern 9, and outputs the release-electric-brake-force comparison pattern 9 to the comparator 7, and generates a release-notification-signal electric-brake-force comparison pattern 10, and outputs the release-notification-signal electric-brake-force comparison pattern 10 to the comparator 8 as a second comparator. The actual electric-brake-force calculator 6 generates the actual electric-brake-force signal 3, and outputs the actual electric-brake-force signal 3 to the machine brake controller 2.

The comparator 7 compares the input electric-brake force instruction 14 with the release-electric-brake-force comparison pattern 9, and outputs a smaller one of these signals to the motor controller 31 as an electric-brake force pattern 11. The electric brake force to be given to each motor of the motor group 32 is controlled following this electric-brake force pattern 11.

The comparator 8 compares the input electric-brake force instruction 14 with the release-notification-signal electric-brake-force comparison pattern 10, generates the release notification signal 4 that is output at the timing when the release-notification-signal electric-brake-force comparison pattern 10 becomes equal to or smaller than the electric-brake force instruction 14, and outputs the release notification signal 4 to the machine brake controller 2.

The actual electric-brake-force calculator 6 calculates the actual electric-brake-force signal 3 and outputs the actual electric-brake-force signal 3 to the machine controller 2, to control the electric brake force to follow the electric-brake force pattern 11.

(Configuration of the Control System of the Comparison Pattern Generator 5)

Figure 3:
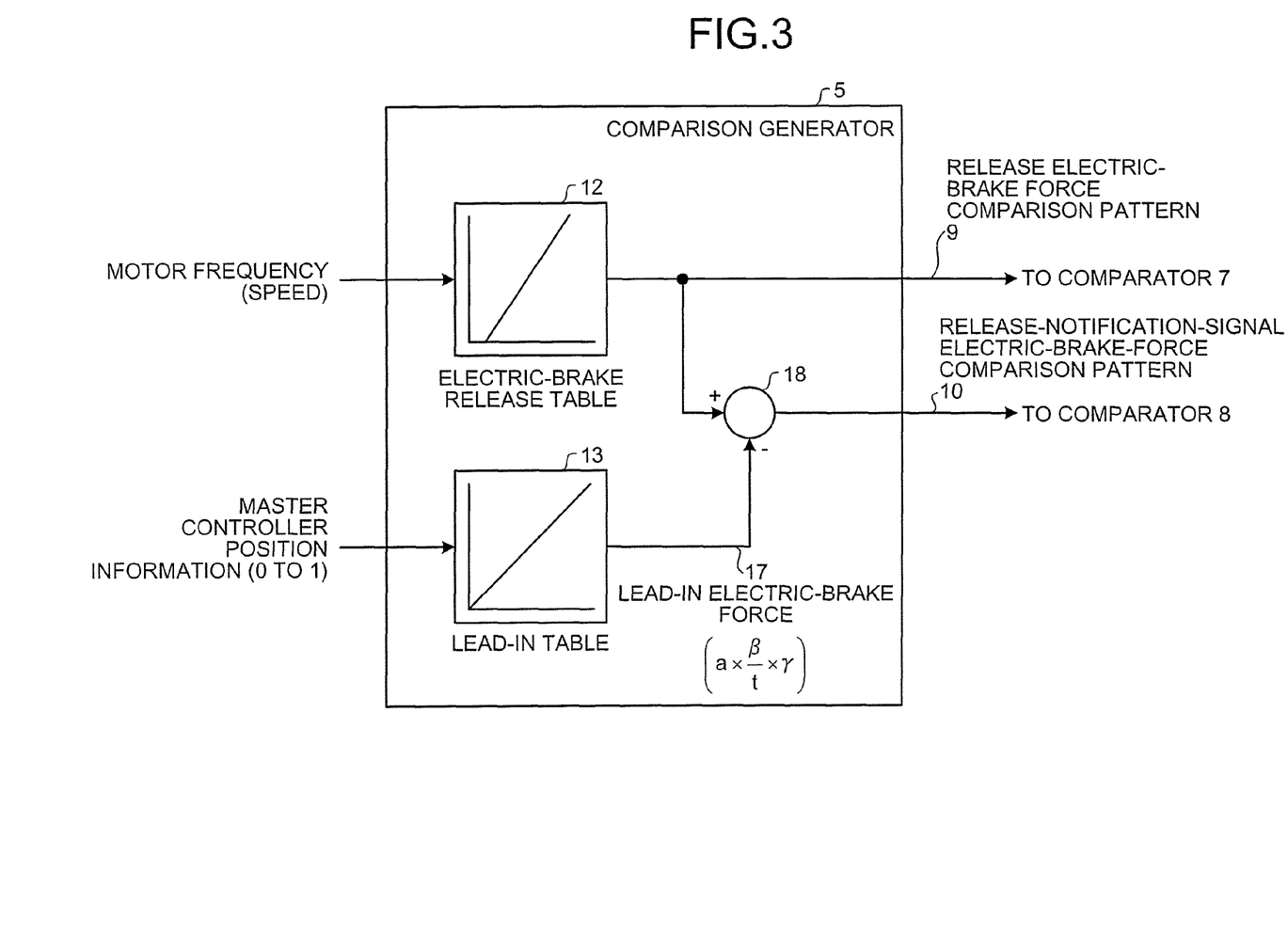
FIG. 3 is a schematic diagram of a control system of a comparison pattern generator in the main converter.
Figure 4:
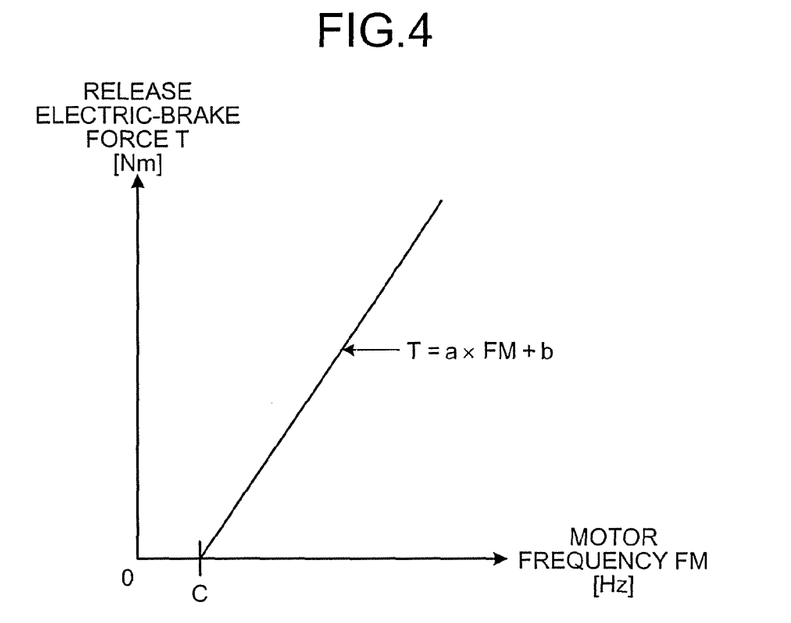
FIG. 4 is a chart of characteristics of an electric-brake release table in the comparison pattern generator.
Figure 5:
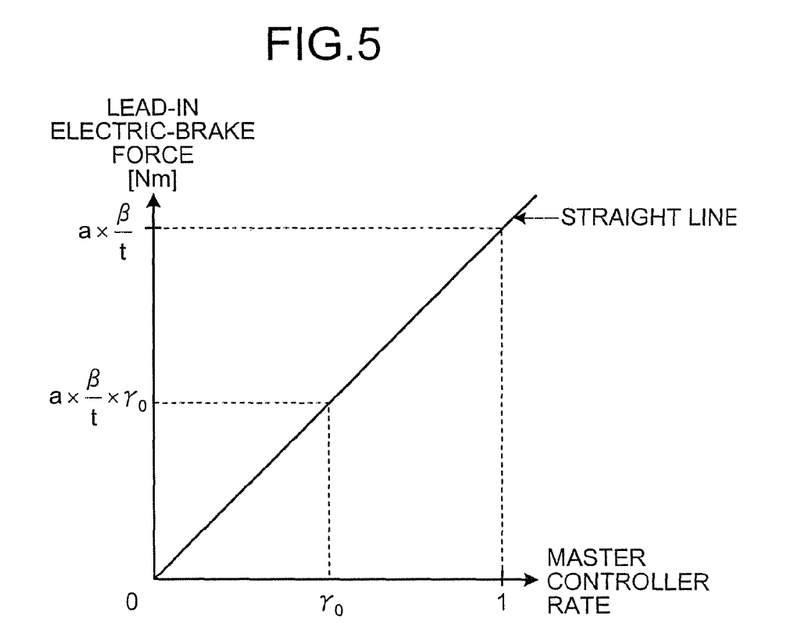
FIG. 5 is a chart of characteristics of a lead-in table in the comparison pattern generator.

FIG. 3 depicts a schematic diagram of the comparison pattern generator 5 in the release-speed-variable-type release-notification-signal generator 16. FIG. 4 is a chart of characteristics of an electric-brake release table 12 in the comparison pattern generator 5. FIG. 5 is a chart of characteristics of a lead-in table 13 in the comparison pattern generator 5. As shown in FIG. 3, the comparison pattern generator 5 in the main converter 1 includes the electric-brake release table 12 as a first reference table, the lead-in table 13 as a second reference table, and a subtractor 18 that subtracts the output of the lead-in table 13 from the output of the electric-brake release table 12. The comparison pattern generator 5 generates the release-electric-brake-force comparison pattern 9 and the release-notification-signal electric-brake-force comparison pattern 10, based on these outputs.

(Operation of the Comparison Pattern Generator 5)

The operation of the comparison pattern generator 5 is explained next with reference to FIGS. 3 to 5.

Explained below is the electric-brake release table 12 provided in the comparison pattern generator 5. In the electric-brake release table 12, as shown in FIG. 4, the horizontal axis represents a motor frequency (FM[Hz]), and the vertical axis represents an electric brake force (T[Nm]), and both have a relation expressed as follows:

$$T = a \times FM + b \quad (1)$$

where a is a constant representing a slope of a straight line, and b is a constant (intercept) representing an interception with the vertical axis. In actual practice, when the motor frequency becomes equal to or lower than a certain value, electric brake force is not generated. A frequency at this time is expressed as C[Hz] in FIG. 4.

In FIG. 4, the comparison pattern generator 5 sets the motor frequency FM as an input variable, and generates a value corresponding to the size of the motor frequency using a characteristic curve of Expression (1). The comparison pattern generator 5 outputs the generated value to the comparator 7 as the release-electric-brake-force comparison pattern 9. The output is also output to the subtractor 18. In the control system shown in FIG. 4, while the input signal to the electric-brake release table 12 is the motor frequency, the input signal can be a speed signal expressing a rotation speed of the motor.

The lead-in table 13 provided in the comparison pattern generator 5 is explained next. The lead-in table 13 shows a straight line as shown in FIG. 5. In FIG. 5, the horizontal axis represents a master controller rate indicating the information of a master controller position, and the vertical axis represents lead-in electric brake force [Nm].

The master controller rate represents the position of the master controller as the main controller of an electric vehicle by a number 0 or 1 linearly allocated. For example, a brake minimum position (or a meandering position) is represented by "0", and a brake maximum position is represented by "1".

In an electric vehicle, a deceleration speed of a railroad vehicle is determined by the master controller rate. Assume that a maximum deceleration speed is α[km/h/s], for example. When the master controller is at the brake maximum position, the deceleration speed becomes α×1=α. When the master controller is at a position of 50% brake, the deceleration speed becomes α×0.5=0.5α. When the master controller is at a position of 0% brake, the deceleration speed becomes α×0=0.

Referring back to FIG. 3, the position information of the master controller is input to the lead-in table 13 as a master controller rate. The comparison pattern generator 5 outputs an output value (change amount of electric brake force) corresponding to the master controller rate input using the lead-in table 13, to the subtractor 18 as lead-in electric-brake force 17. The subtractor 18 outputs an output difference signal of a difference between the release-electric-brake-force comparison pattern 9 and the lead-in electric-brake force 17 to the comparator 8 as the release-notification-signal electric-brake-force comparison pattern 10.

Figure 6:
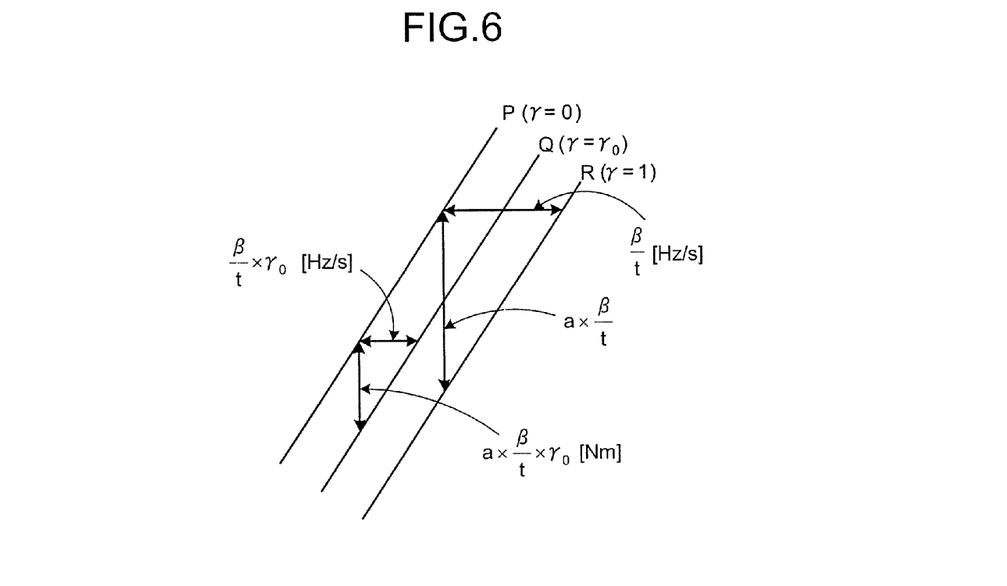
FIG. 6 depicts a concept of lead-in electric brake force that varies according to a master controller rate.

A method of calculating the lead-in table 13 to output the release notification signal 4 corresponding to the master controller rate at a certain time before releasing the electric brake is explained with reference to FIGS. 4 to 6. FIG. 6 depicts a concept of the lead-in electric brake force that varies according to the master controller rate.

Consider that the release notification signal 4 is output at a certain time (t seconds) before actually releasing the electric brake, when the maximum deceleration rate is α.

First, the maximum deceleration rate α[km/h/s] is converted to the motor frequency FM[Hz], and is also converted to a frequency change amount ΔFM per t[s]. Assume that a conversion rate from a motor speed to a motor frequency is K. This conversion rate K has a dimension of [K]=[Hz]/[km/h/s]=[Hz·h·s/km]. Therefore, the frequency change amount ΔFM has a dimension expressed as follows:

$$[\Delta FM] = [K \times \alpha / t] \quad (2)$$
$$= [Hz \cdot h \cdot s/km] \times [km/h/s] / [s]$$
$$= [Hz/s]$$

When "K×α" is replaced by "β", a frequency change amount Δβ per t[s] is expressed as Δβ=β/t=(K×α/t).

As shown in FIG. 4, the slope of the release-electric-brake-force comparison pattern 9 is "a". Therefore, when the master controller rate is 1, the release notification signal 4 can be output t seconds beforehand, when a difference (difference of brake force) between the release-electric-brake-force comparison pattern 9 and the release-notification-signal electric-brake-force comparison pattern 10, that is, the output of the comparator 8 (see FIG. 2), is "a×(β/t)".

This relationship changes linearly during a period from when the master controller rate is 0 to 1. In FIG. 6, a straight line P represents release electric-brake force (corresponding to a characteristic curve in FIG. 4) when a master controller rate γ=0. Similarly, a straight line Q represents release electric-brake force when the master controller rate γ=γ₀(0<γ<1), and a straight line R represents release electric-brake force when the master controller rate γ=1. That is, when the master controller rate=γ, the release notification signal 4 can be output t seconds beforehand, when a difference between the release-electric-brake-force comparison pattern 9 and the release-notification-signal electric-brake-force comparison pattern 10, that is, the output of the comparator 8, is "(a×β/t)×γ"

To output the release notification signal 4, a reference table that prescribes a relationship between "a×β/t" and the master controller rate γ needs to be prepared. A lead-in table shown in FIG. 5 is provided for this purpose. A slope of a straight line shown in FIG. 5 is a×(β/t). When the master controller rate γ=1, a value of "a×(β/t)" is output to the subtractor 18 as the lead-in electric-brake force 17. When the master controller rate γ=γ₀, a value of "a×(β/t)" is output to the subtractor 18 as the lead-in electric-brake force 17.

Figure 7:
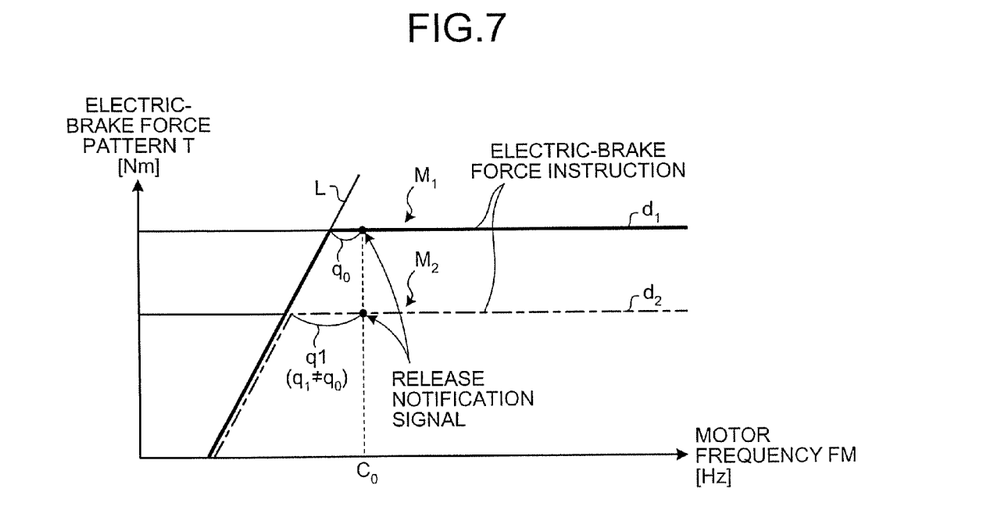
FIG. 7 is a schematic diagram for explaining a concept of a release notification signal according to a conventional technology.
Figure 8:
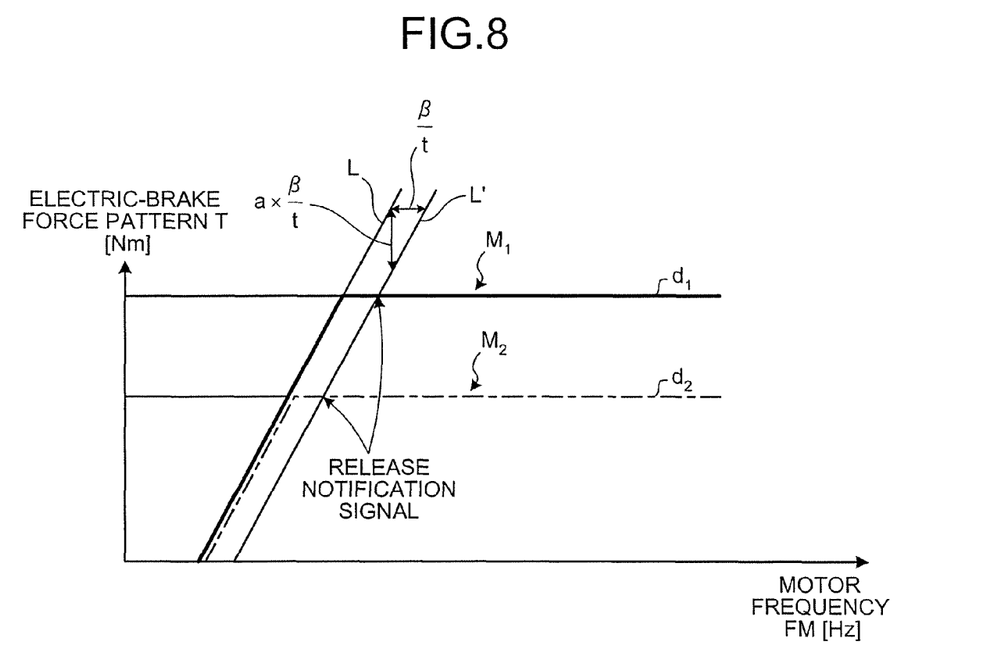
FIG. 8 is a schematic diagram for explaining a concept of a release notification signal according to the embodiment.

FIG. 7 is an schematic diagram for explaining a concept of the release notification signal (electric-brake-force expiration-notification signal described in Patent Document 1) according to a conventional technology. FIG. 8 is schematic diagram for explaining a concept of the release notification signal according to the embodiment.

In FIG. 7, a straight line L is a waveform corresponding to the release brake force shown in FIG. 4. A straight line d₁ and a straight line d₂ extending toward the vertical axis in parallel with the horizontal axis (motor frequency axis) represent electric-brake force instructions output from the electric-brake-force instruction controller 15. That is, a waveform M₁ indicated by a thick solid line including parts of the straight line L and the straight line d₁ represents the electric-brake force pattern 11 when the electric-brake force instruction 14 is large. A waveform M₂ indicated by a chain line including parts of the straight line L and the straight line d₂ represents the electric-brake force pattern 11 when the electric-brake force instruction 14 is small. As shown in FIG. 7, at the closing speed of the electric brake control, the electric brake force is held at a constant value up to a certain speed (each intersection point between the straight line L and the straight lines d₁ and d₂). Thereafter, the electric brake force is linearly controlled to become 0 [Nm]. At a point of time of the speed (C₀) immediately before the electric brake force is released, the release notification signal is output.

In FIG. 8, the straight line L corresponds to the output of the release-electric-brake-force comparison pattern 9 output from the electric-brake release table 12, and a straight line L' corresponds to the output of the release-notification-signal electric-brake-force comparison pattern 10 output from the subtractor 18. The output of the subtractor 18 is obtained by subtracting "a×(β/t)" (the master controller rate γ=1) as the output of the lead-in table 13 from the output of the release-electric-brake-force comparison pattern 9. While the straight line L' moves downward from the straight line L, this is equivalent to the move of the straight line L' to the right direction by "β/t".

According to the conventional technology, the release notification signal is output at a point when the speed is slightly higher than the electric-brake releasing speed, as described above. Therefore, the output timing of the release notification signal is not maintained constant (q₀≠q₁), and causes excessive brake force or shortage of brake force.

On the other hand, according to the embodiment, as shown in FIG. 8, the output timing of the release notification signal does not depend on the size of the electric brake instruction, and it becomes theoretically possible to maintain a constant timing. When the command rate changes, the size of the lead-in electric brake force which is input to the subtractor 18 is adjusted, as described above. Therefore, the release notification signal can be output at a constant timing without depending on the master controller rate.

As explained above, in the brake control device for an electric vehicle according to the embodiment, the electric-brake-force instruction controller 15 outputs the electric-brake force instruction 14 to each motor. The comparison pattern generator 5 generates the release-electric-brake-force comparison pattern 9 for changing over the electric brake force to the machine brake force while reducing the electric brake force to zero at the closing speed time of the electric brake. At the same time, the comparison pattern generator 5 generates the release-notification-signal electric-brake-force comparison pattern 10 by shifting the release-electric-brake-force comparison pattern 9 to a side on which the motor-frequency increases by a predetermined frequency. The comparator 7 outputs, as the electric-brake force pattern, a smaller signal selected from the electric-brake force instruction 14 and the release-electric-brake-force comparison pattern 9 to the motor controller 31. The comparator 8 outputs, as the release notification signal 4, a signal output at a timing when the release-notification-signal electric-brake-force comparison pattern 10 becomes equal to or smaller than the electric-brake force instruction 14 to the machine brake controller 2. Therefore, a time difference between the timing of releasing the electric brake and the timing of outputting the release notification signal can be set approximately constant. Consequently, excessive brake force or shortage of brake force can be suppressed.

In the brake control device for an electric vehicle according to the embodiment, a frequency shift amount by which the release-electric-brake-force comparison pattern 9 is shifted to a side on which motor frequency increase is calculated based on the selection position of the master controller as the main controller of the electric vehicle. Therefore, release notification signals can be output at constant timing without depending on the master controller rate. Even when the position of the master controller is changed, excessive brake force or shortage of brake force can be avoided.

INDUSTRIAL APPLICABILITY

As described above, the brake control device for an electric vehicle according to the present invention is advantageous for increasing energy-saving effect and suppressing cost increase without causing excessive brake force or shortage of brake force.

The invention claimed is:

1. A brake control device for an electric vehicle, comprising:
   a motor controller that outputs a motor control signal for controlling at least one motor that drives the electric vehicle;
   an electric brake controller that outputs a brake-force signal indicating electric brake force generated by the motor, and a notification signal for notifying, at a defined time before, that an electric brake is to be released; and
   a machine brake controller that controls total force consisting of electric brake force and machine brake force based on the brake-force signal and the notification signal, wherein
   the electric brake controller includes
   an electric-brake-force instruction controller that generates an instruction signal for instructing the motor with respect to electric brake force;
   a comparison pattern generator that generates a first pattern signal for, while reducing electric brake force to zero at a closing speed of the electric brake, changing over the electric brake force to machine brake force, and a second pattern signal obtained by shifting the first pattern signal by a predetermined frequency to a side on which motor frequency increases;
   a first comparator that compares the instruction signal with the first pattern signal, and outputs, as an electric-brake force pattern, a smaller one of the instruction signal and the first pattern signal to the motor controller; and
   a second comparator that compares the instruction signal with the second pattern signal, and outputs, as the notification signal, a signal output at a timing when the second pattern signal becomes equal to or smaller than the instruction signal to the machine brake controller.

2. The brake control device according to claim 1, wherein the predetermined frequency by which the first pattern signal is shifted is calculated based on a position of a master controller of the electric vehicle.

3. The brake control device according to claim 1, wherein the comparison pattern generator includes
   a first reference table for calculating electric brake force of the motor corresponding to operation frequency of the motor; and
   a second reference table for calculating an amount of change in electric brake force corresponding to a position of a master controller of the electric vehicle as the predetermined frequency by which the first pattern signal is shifted, wherein
   the comparison pattern generator outputs, as the second pattern signal, a signal obtained by subtracting a value of output calculated by the second reference table from a value of output calculated by the first reference table to the second comparator.

* * * * *